June 10, 1958 R. A. DAVIS 2,838,115
MULTIPLE PUNCH PREVENTION DEVICE
Filed Dec. 14, 1955
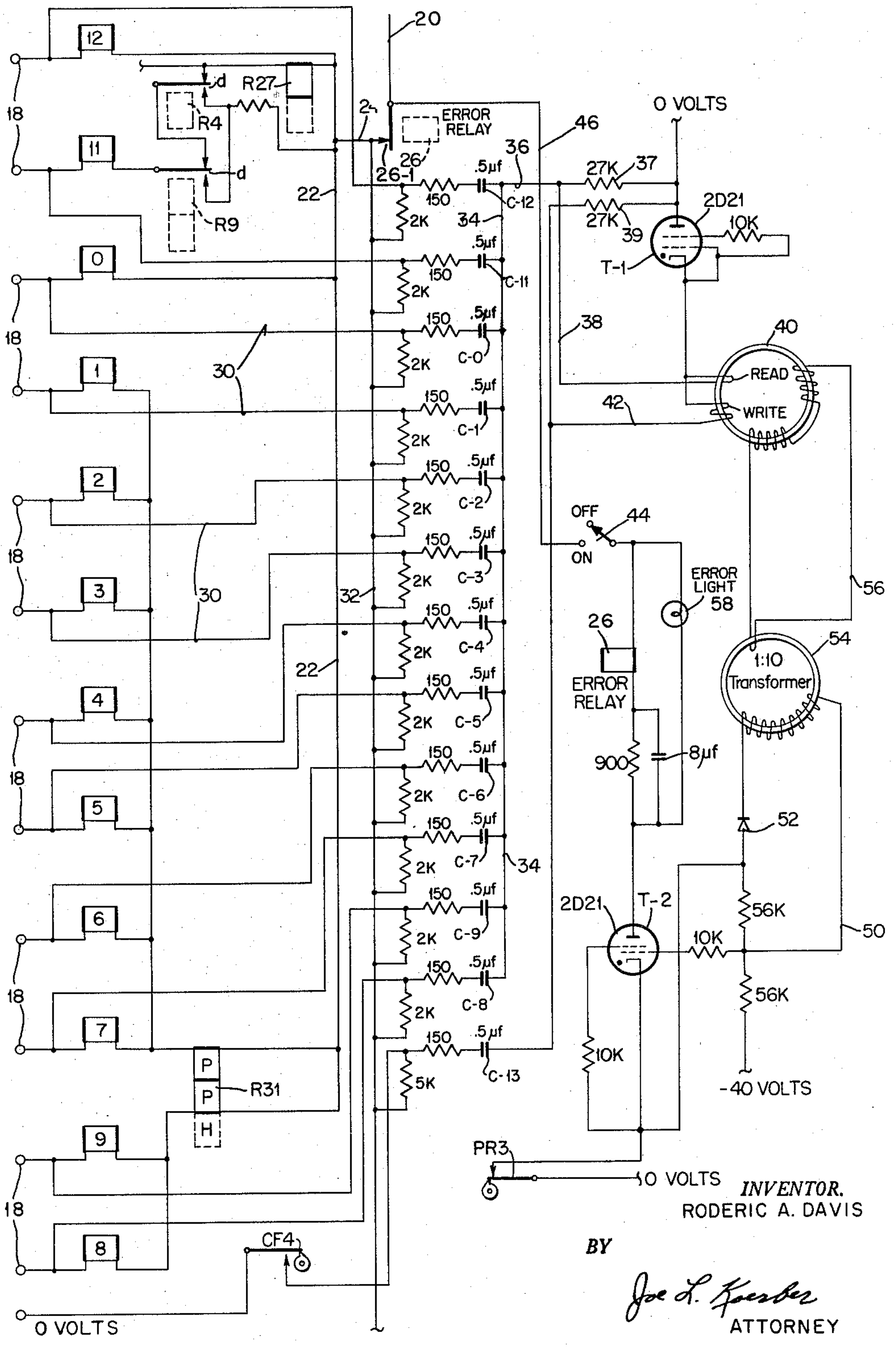
INVENTOR.
RODERIC A. DAVIS
BY
Joe L. Koerber
ATTORNEY United States Patent Office 2,838,115

Patented June 10, 1958

2,838,115

MULTIPLE PUNCH PREVENTION DEVICE

Roderic A. Davis, Hopewell Junction, N. Y., assignor to International Business Machines Corporation, New York, N. Y., a corporation of New York Application December 14, 1955, Serial No. 553,039

7 Claims. (Cl. 164—115)

This invention relates to card punching machines and more particularly to a device for use with a card punching machine to prevent multiple punching where only single punching is required.

Punched cards are well-known in business accounting operations. Accuracy of the punched records is essential and a high output per punch machine is highly desirable. Many devices directed to improving the accuracy of punched records are disclosed by prior art. Various devices are directed specifically to the detection of multiple punching where only single punching is required. However, detection of the multiple punching, while providing the desired accuracy, does not prevent the loss of time involved in correcting the error.

The principal object of this invention is to provide a device for preventing multiple punching where only single punching is required.

Another object of this invention is to provide a device to detect the erroneous setting up of multiple punch elements.

Still another object of this invention is to provide a device to detect the setting up of multiple punch elements when a single punch element is required and to prevent all punching in order that the error may be corrected before the record card is ruined by erroneous punching.

A further object is to provide an electronic multiple punch detection and prevention device.

Other objects of the invention will be pointed out in the following description and claims and illustrated in the accompanying drawing, which disclose, by way of example, the principle of the invention and the best mode, which has been contemplated, of applying that principle.

In the drawing:

The figure is a partial wiring diagram illustrating the detection and prevention circuitry.

The subject device is illustrated in the accompanying drawing and described hereinafter in conjunction with a duplicating card punch of the type shown and described in detail in Patent 2,647,581, issued August 4, 1953, to E. W. Gardinor et al. However, by suitable changes within the scope of this invention, the device may be applied to other record machines.

The machine to which the subject invention is applied is shown and described in detail, in the above patent; therefore, only so much of the circuit of that machine as is necessary to the understanding of this invention is shown in the accompanying drawing.

The machine operates generally in the following manner: A plurality of record cards are placed in a card hopper and are fed one at a time first through a punch station and then through a read station and finally are stacked in a stacker hopper. Each card passes through the punch and read stations in a column by column manner. During its passage through the punch station, a card may be perforated under control of either a manually operable keyboard or a record card which is concurrently passing through the read station.

Referring to the figure, the usual punch interposer magnets 0–9, 11 and 12 are shown. The 0–9 magnets are designated "digit" magnets whereas the 11 and 12 magnets are designated "zone" magnets. The 0 magnet may be either a "digit" or a "zone" magnet in accordance with the well known IBM code. When data are either keyed on the keyboard or read from a card in the read station, selected ones of terminals 18 located on one side of the interposer magnets and corresponding to the keyed or read digit are connected through contacts, not shown in the figure, to a zero potential line. The opposite sides of the interposer magnets are tied to a positive potential line 20. When one or more of the interposer magnets are thus energized, corresponding punch interposers, described in the above cited patent, are actuated and a cycle of a punch shaft (not shown) is automatically initiated, which actuates punch elements corresponding to the actuated ones of the interposers whereby the keyed or read data are recorded by coded perforations in the record card at the punch station.

An interposer magnet requires approximately five milliseconds to become sufficiently energized to actuate the related interposer; therefore, by detecting the erroneous selection of interposer magnets and breaking the energizing circuits in less than five milliseconds, the erroneous perforation of the record card may be prevented.

Referring to the figure, one side of each interposer magnet is common connected to a line 22 which is connected through a line 24 and normally closed contacts 26—1 of an error relay 26 to the positive potential line 20. Two thousand ohm (2K ohm) resistors are connected by lines 30 and a common line 32 in parallel with each interposer magnet from the terminals 18 to the line 20. The terminal side of each 2K ohm resistor is connected through a series connected 150 ohm resistor and a 0.5 microfarad condenser to a common line 34. The line 34 is connected through a line 36 and a 27K ohm resistor 37 to a zero potential supply. The line end of the resistor 37 is connected by a line 38 which forms a single turn around a ferrite core 40 and is connected to the cathode of a type 2D21 gas tube designated T–1.

The plate of the tube T–1 is connected to the zero potential supply; the first grid is tied to the cathode and the second grid is coupled to the cathode through a 10K ohm resistor.

A series connected RC network comprising 5K ohm and 150 ohm resistors, an 0.5 microfarad condenser C–13 and another 27K ohm resistor 39, is connected between the line 32 and the zero potential supply. The junction of the condenser and the 27K ohm resistor is connected by a line 42, which forms two turns around the ferrite core 40 in a sense opposite the sense of the single turn of the line 38, to the cathode of the tube T–1. The junction of the 5K ohm and 150 ohm resistors is connected through cam contacts CF4 to a zero potential line. The contacts CF4 are actuated during each card cycle of the machine. The contacts close at sixty-five degrees of the card feed cycle and open at eightly degrees.

A second type 2D21 gas tube designated T–2 has its cathode connected through contacts PR3 to a zero potential supply. These contacts are normally closed but open shortly after the reading or punching of the last column of a card. The plate of the tube T–2 is connected through a parallel RC network comprising a 900 ohm resistor and an eight microfarad condenser, through the coil of the error relay 26, a manual switch 44 and a line 46 to the positive potential line 20. A neon error light 58 is connected in parallel around the RC network and the error relay 26. The second grid of the tube T–2 is tied through a 10K ohm resistor to the cathode. The first grid is connected through a 10K ohm resistor and a line 50 and a rectifier 52 to the cathode. The line 50 forms ten turns around the core 54 of a transformer forming the secondary winding thereof. The cathode end of the rectifier is connected to the transformer end of the line 50 by a 56K ohm resistor. The junction of the latter resistor and the line 50 is tied through another 56K ohm resistor to a minus forty volt supply.

A wire 56 forms a ten turn secondary winding for the core 40 and a one turn primary winding for the core 54.

*Operation*

The machine described may be operated selectively as a numeric machine or as a combination alphabetic and numeric machine. As applied in this instance, the novel device is designed to detect the energizing of more than one interposer magnet during numeric operation. The error might be due to the energizing of more than one "digit" interposer magnet; to one or more "digit" interposer magnets and one or more "zone" interposer magnets; or even to the two "zone" interposer magnets. For combined alphabetic and numeric operation, the switch 44 may be moved to the Off position to disable the multiple punch prevention circuits. The latter circuits must be disabled in this instance since the alphabetic and special characters are correctly represented by two or more coded perforations.

The switch 44 is closed to enable the multiple punch prevention circuits. By virtue of the zero potential at the plate of the tube T–1 and the positive potential of the line 20, the 0.5 microfarad condensers designated C–0 through C–13 are charged to approximately plus 140 volts. A card feed cycle is initiated after which it is assumed that a punched card is registered at the read station and an unpunched card is registered at the punch station. In the following description, it is understood that the punches are under control of the read station; however, as described hereinbefore, the machine may be operated under control of a keyboard and the operation of the multiple prevention device would be the same.

At sixty-five degrees of the card feed cycle, the contacts CF4 close and the junction of the 5K ohm and 150 ohm resistors associated with the condenser C–13 are connected to the zero potential line through the contacts CF4. The plus 140 volt charge on the condenser C–13 cannot change instantaneously and potential on the right side of the condenser C–13 drops to minus 140 volts and, through the line 42, applies the minus 140 volt potential to the cathode of the tube T–1. The tube plate is at zero potential and the tube T–1 conducts. The current through the line 42 forming two turns about the ferrite core 40 switches the core to a so-called zero state.

When the cards are registered as described, a dummy cycle is initiated automatically during which sensing pins rise to sense perforations in the first column of the card at the read station. Terminals 18, corresponding to sensed holes, are connected to the zero potential line as described hereinbefore. At that time, circuits are complete from the connected terminals 18 through respective interposer magnets and intervening circuitry to the line 22, and through the error relay contacts 26—1 to the positive potential line 20 and the energization of the interposer magnets commences although full energization requires approximately five milliseconds. When a terminal 18 is connected to the zero potential line, the right-hand side of the corresponding capacitor C–0 through C–12 drops momentarily from zero volts to minus 140 volts, applying the minus 140 volt potential to the cathode of the tube T–1 through the line 38. The latter capacitor discharges through the line 38 which forms a single turn around the ferrite core 40 and tends to reverse the state of the core 40 to a so-called one state. The magnetomotive force due to the discharge of the single capacitor through the single turn of the line 38 is only half the required magnitude and the state of the core 40 is not altered and punching takes place in the usual manner. However, if two of the terminals 18 had been connected to the zero potential line, the resultant magnetomotive force due to the discharge of two capacitors C–0 through C–12 is sufficient to reverse the state of the core 40. The reversal flux induces a current in the windings 56 which is amplified by the transformer 54 and is applied to the first grid of the tube T–2 which then conducts, energizing the error relay 26 and turning on the error light 58. The error relay contacts 26—1 open, breaking the interposer magnet circuit to the positive potential line 20. Since five milliseconds have not elapsed since the terminals 18 were connected to the zero potential line, the interposer magnets do not become fully energized, the interposers are not actuated, and the erroneous punching does not occur.

Steps may be taken to correct the erroneous card at the read station or the erroneous keying of the keyboard as the case may be.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What I claimed is:

1. In a record perforating machine comprising, a plurality of devices operable for perforating a record, a plurality of electrical means corresponding to said devices and energizable selectively for conditioning said corresponding devices in accordance with a single element code, and means for operating conditioned ones of said perforating devices, the combination of a toroidal magnetic core, means for establishing said core in one magnetic state, a plurality of means controlled by corresponding ones of said plurality of electrical means and indicative of the selection respectively of said corresponding electrical means, the selection of two or more of said plurality of means being effective to reverse said magnetic state, and means operable by change of flux during said reversal of magnetic state for inhibiting energization of said electrical means whereby perforating is inhibited.

2. The invention of claim 1, wherein said means operable in response to said reversal of magnetic state comprises a relay which opens a common circuit to said electrical means whereby energization of said electrical means is inhibited.

3. The invention of claim 2, having a signal light connected in parallel with said relay for visual indication of the selection of more than one of said electrical means.

4. In a cyclically operable record punching machine comprising a plurality of punch elements operable for punching coded holes in a record, a plurality of actuatable interposers corresponding to said punch elements, a plurality of interposer magnets operable for actuating said interposers, means operable for selectively completing actuating circuits to said interposer magnets, and means operable for actuating punch elements corresponding to actuated ones of said interposers, the combination of a toroidal magnetic core, means operable during each machine cycle for changing said core to one magnetic state, a plurality of means operable in response to the selection of respectively corresponding ones of said interposer magnets each supplying one-half the magnetomotive force required to change said core to an opposite magnetic state, means operable by change of flux during said change to an opposite magnetic state for opening said selectively completed actuating circuits whereby punching is inhibited.

5. In a recording machine comprising a plurality of devices operable for recording on a record, a plurality of electrical means corresponding to said devices and energizable selectively for conditioning said corresponding devices in accordance with a single element code, and means for operating conditioned ones of said recording devices, the combination of a magnetic toroidal core, means for magnetizing said core in one magnetic sense, a plurality of means controlled by corresponding ones of said plurality of electrical means and indicative of the selection respectively of said corresponding electrical means, the selection of more than one of said plurality of means being effective to reverse said one magnetic state, and means operable by change of flux during said reversal of magnetic state for inhibiting energization of said electrical means whereby recording is inhibited.

6. In a cyclically operable recording machine comprising a plurality of devices operable for recording on a record, a plurality of electrical means corresponding to said devices and energizable selectively for conditioning said corresponding devices, and means for operating conditioned ones of said recording devices, the combination therewith of a toroidal magnetic core, means including an electron tube and cyclically operable circuit means for turning said tube on for setting said core in one magnetic state, a plurality of second electrical means corresponding to first said electrical means, each said second electrical means being operable in parallel with corresponding first said electrical means, the coincident actuation of more than one of said second electrical means being effective to turn said tube on for reversing first said magnetic state of said core, a relay having contacts in a common energizing circuit of first said electrical means, means operable by a change of flux during said reversal of magnetic state for energizing said relay whereby said common circuit is broken and energization of first said electrical means is inhibited.

7. The invention of claim 6 wherein said means operable by said change of flux includes a transformer coupled to a control grid of a second electron tube the turning on of which energizes said relay.

References Cited in the file of this patent

UNITED STATES PATENTS

| | | |
|---|---|---|
| 1,972,985 | Gardner | Sept. 11, 1934 |
| 2,647,581 | Gardinor | Aug. 4, 1953 |